(12) United States Patent
Stine et al.

(10) Patent No.: US 8,446,817 B2
(45) Date of Patent: May 21, 2013

(54) DISTRIBUTED VIRTUAL FIBRE CHANNEL OVER ETHERNET FORWARDER

(75) Inventors: Elizabeth Stine, San Jose, CA (US); Brian Shlisky, Centerport, NY (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 12/689,904

(22) Filed: Jan. 19, 2010

(65) Prior Publication Data

US 2011/0176412 A1 Jul. 21, 2011

(51) Int. Cl.
*G01R 31/08* (2006.01)
(52) U.S. Cl.
USPC .......................................... 370/217; 370/220
(58) Field of Classification Search
USPC .......................................... 370/216–217, 220
See application file for complete search history.

(56) References Cited

U.S. PATENT DOCUMENTS

| 7,792,148 | B2* | 9/2010 | Carlson et al. | 370/474 |
|---|---|---|---|---|
| 2008/0159277 | A1* | 7/2008 | Vobbilisetty et al. | 370/357 |
| 2009/0003313 | A1* | 1/2009 | Busch et al. | 370/352 |
| 2009/0041046 | A1* | 2/2009 | Hirata | 370/402 |
| 2009/0245242 | A1 | 10/2009 | Carlson et al. | |
| 2009/0252181 | A1* | 10/2009 | Desanti | 370/474 |
| 2009/0254677 | A1* | 10/2009 | Desanti | 709/242 |

FOREIGN PATENT DOCUMENTS

EP 2112589 A2 10/2009

OTHER PUBLICATIONS

Tate, Jon, "An Introduction to Fibre Channel over Ethernet, and Fibre Channel over Convergence Enhanced Ethernet," IBM Redpaper, Mar. 18, 2009, pp. 1-18, Retrieved from the internet: http://www.redbooks.ibm.com/redpapers/pdfs/redp4493.pdf [retrieved on May 16, 2011].
International Search Report for Application No. PCT/US2011/021417 dated May 26, 2011.

* cited by examiner

*Primary Examiner* — Mark Rinehart
*Assistant Examiner* — Matthew Hopkins
(74) *Attorney, Agent, or Firm* — Patterson & Sheridan, LLP

(57) ABSTRACT

A virtual Fibre Channel over Ethernet (FCoE) forwarder (vFCF) distributed in the core layer of an FCoE environment between two or more FCoE-enabled core switches by using a single virtual domain ID for the FCoE forwarders (FCFs) in a fabric is provided. In this manner, the network problem of having a single point of failure in a fabric is eliminated without needing to double the number of core switches in the FCoE environment for redundancy. Because the login and state information is distributed between the FCoE-enabled core switches of a fabric, the loss or failure of a core switch no longer means that the fabric goes down. Instead, when a core switch fails, the hosts and initiators may stay logged in through the other core switches.

19 Claims, 5 Drawing Sheets

DISTRIBUTED VIRTUAL FIBRE CHANNEL OVER ETHERNET FORWARDER

TECHNICAL FIELD

Embodiments of the present disclosure generally relate to Fibre Channel over Ethernet (FCoE) and, more particularly, to a virtual FCoE forwarder (vFCF) distributed between two or more FCoE-enabled core switches.

BACKGROUND

Fibre Channel (FC) is a network technology primarily used for storage networking and running at gigabit speeds. FC is standardized in the T11 Technical Committee of the International Committee for Information Technology Standards (IN-CITS) and has become the standard connection type for storage area networks (SANs) in enterprise storage.

Fibre Channel over Ethernet (FCoE) is a mapping of FC frames natively over Ethernet, but is independent of the Ethernet forwarding scheme. This allows Fibre Channel to leverage 10 gigabit Ethernet networks while preserving the FC protocol, allowing a seamless integration with existing FC networks and management software. By preserving all FC constructs—maintaining the same latency, security, and traffic management attributes of FC while preserving investments in FC tools, training, and SANs, FCoE provides for I/O consolidation. FC is recognized as the dominant storage protocol in the data center, but the consolidation comes from using Ethernet to avoid creating another separate network.

The current proposal for FCoE, as defined by the INCITS T11 standards body, leverages a lossless Ethernet fabric, maintains the FC operational model, and includes a newly approved frame format. Of note, FCoE is not tied to 10 gigabit Ethernet (10GE) and will be able to run over networks with varying interface speeds.

Modern datacenters use both Ethernet for Transmission Control Protocol/Internet Protocol (TCP/IP) networks and FC for SANs, each dedicated to specific purposes. Ethernet networks are typically implemented when end-users need to transfer relatively small amounts of information over both local and global distances or in clustered, low-latency computer environments. SANs are generally utilized when access to block I/O for applications such as booting over SANs, mail servers, file servers, and large databases are required. Deploying SANs has a number of benefits including: (1) centralized management, security, and administration of the storage resources, (2) uniform delivery of storage services such as periodic backups, and (3) running efficient utilization levels of storage resources.

OVERVIEW

Embodiments of the present disclosure generally relate to a virtual Fibre Channel over Ethernet (FCoE) forwarder (vFCF) where login and state information are distributed between two or more FCoE-enabled core switches.

One embodiment of the present disclosure provides a method of FCoE communication. The method generally includes representing media access control (MAC) addresses of two or more FCoE forwarders (FCFs) with a single MAC address; receiving an FCoE frame addressed with the single MAC address; in the absence of a communication failure with any of the two or more FCFs, forwarding the FCoE frame to a first FCF of the two or more FCFs; and after the occurrence of a communication failure with any of the two or more FCFs, forwarding the FCoE frame to a second FCF of the two or more FCFs. The single MAC address may be the MAC address of a vFCF.

Another embodiment of the present disclosure provides logic encoded in one or more tangible media for execution. When executed, the logic is operable to represent MAC addresses of two or more FCFs with a single MAC address; receive an FCoE frame addressed with the single MAC address; in the absence of a communication failure with any of the two or more FCFs, forward the FCoE frame to a first FCF of the two or more FCFs; and after the occurrence of a communication failure with any of the two or more FCFs, forward the FCoE frame to a second FCF of the two or more FCFs.

Yet another embodiment of the present disclosure provides an apparatus for FCoE communication. The apparatus generally includes a Network Address Translation (NAT) table mapping MAC addresses of two or more FCFs to a single MAC address and logic configured to receive an FCoE frame addressed with the single MAC address, to forward the FCoE frame to a first FCF of the two or more FCFs in the absence of a communication failure with any of the two or more FCFs, and to forward the FCoE frame to a second FCF of the two or more FCFs after the occurrence of a communication failure with any of the two or more FCFs. Forwarding the FCoE frames in the absence of or after the occurrence of a communication failure is typically based on the NAT table.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Embodiments of the present disclosure provide a virtual Fibre Channel over Ethernet (FCoE) forwarder (vFCF) distributed in the core layer of an FCoE environment between two or more FCoE-enabled core switches by using a single virtual domain ID for the FCoE forwarders (FCFs) in a fabric. In this manner, the network problem of having a single point of failure in a fabric is eliminated without needing to double the number of core switches in the FCoE environment for redundancy. Because the login and state information is distributed between the FCoE-enabled core switches of a fabric, the loss or failure of a core switch no longer means that the fabric goes down. Instead, when a core switch fails, the hosts and initiators may stay logged in through the other core switches.

Figure 1:
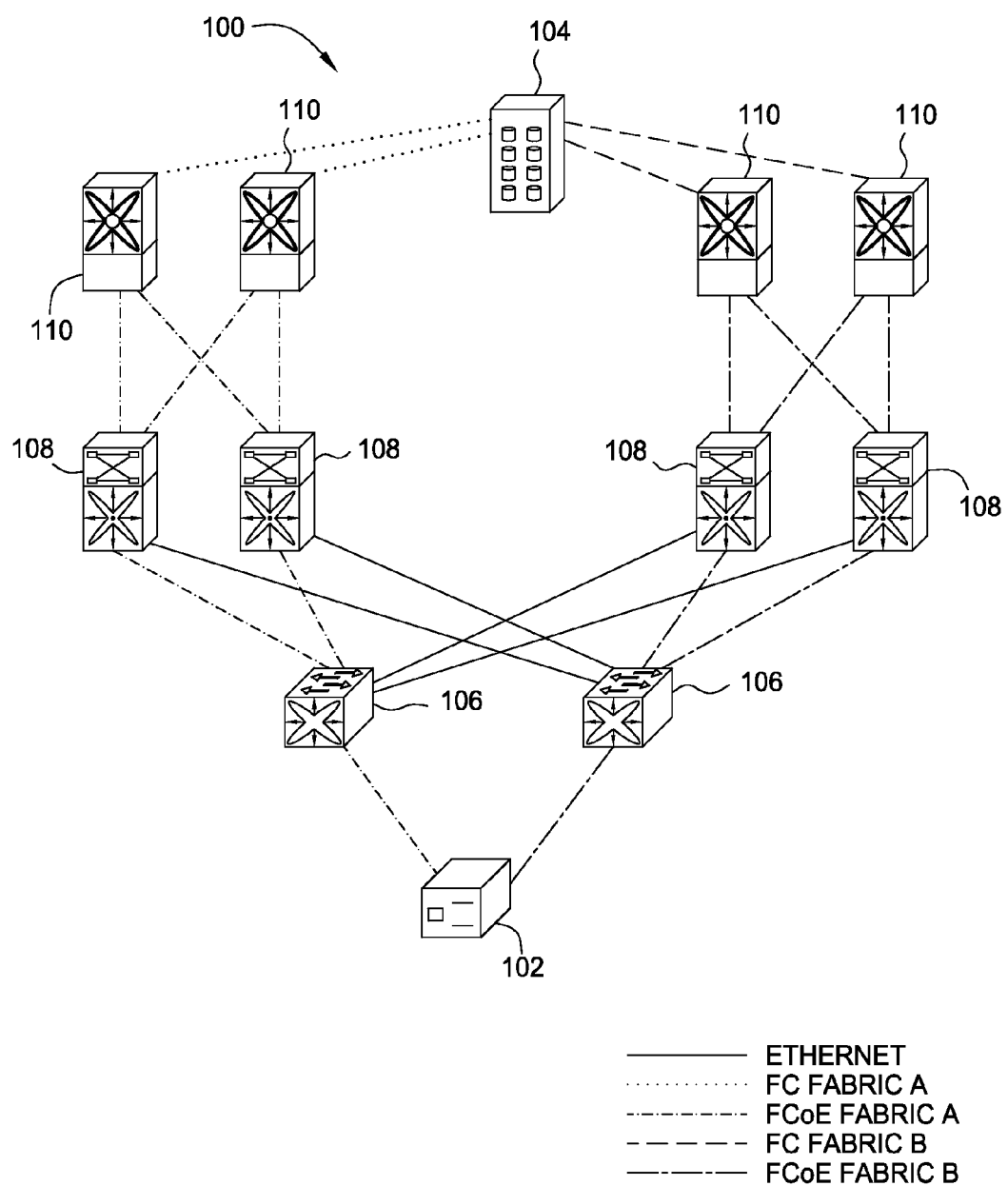
FIG. 1 illustrates an example Fibre Channel over Ethernet (FCoE) topology where each FCoE core switch has a different FCoE forwarder (FCF), in accordance with one embodiment of the present disclosure.

FIG. 1 illustrates an example Fibre Channel over Ethernet (FCoE) dual-fabric topology 100 having fabrics A and B. This infrastructure may be well-suited to storage communications, and therefore, may be implemented in a storage area network (SAN), for example. A fabric is similar in concept to a network segment in a local area network (LAN), and a typical FCoE SAN fabric may comprise a number of FCoE-enabled switches. These FCoE-enabled switches may be used to allow a host 102 to access a server 104, which may store a large amount of data in one or more various forms (e.g., one or more databases).

The host 102 may interface with the SAN via two switches 106, one for each fabric in the topology 100, at the access layer. The two access layer switches 106 may comprise FCoE Initialization Protocol (FIP) snooping bridges. For some embodiments, the access layer switches 106 may comprise Nexus 5000 series switches supporting FIP snooping available from Cisco Systems, Inc.

In the topology 100 of FIG. 1, a core layer is depicted above the access layer. The core layer in storage area networks is analogous to the distribution layer in Ethernet architectures. The core layer may comprise various FCoE core switches 108, each with an FCoE forwarder (FCF) for fabric login and address assignment as described in greater detail below. For some embodiments, the core switches 108 may comprise Nexus 7000 series switches available from Cisco Systems, Inc.

The core switches 108 of a fabric may be linked to one or more switches 110 at the edge layer of the topology 100. The edge layer switches 110 may interface with the server 104 via native Fibre Channel (FC) as illustrated in FIG. 1. For some embodiments, the edge layer switches 106 may comprise MDS 9000 series multilayer switches from Cisco Systems, Inc.

In native FC, access layer switches control the logins of locally attached devices. Initiators and targets login to the Domain and Name servers in FC networks to receive their Fibre Channel ID (FCID) in order to begin communicating on the fabric. The failure domain is only as large as the number of devices locally connected to that switch or director. This failure domain may be increased with the use of N Port Virtualization/N Port ID Virtualization (NPV/NPIV) enabled switches.

In an FCoE environment on the other hand, the fabric login process is typically controlled by the FCF. The FIP handles the communication from ENodes (FC Nodes with one or more lossless Ethernet media access control (MAC) addresses, each coupled with an FCoE controller) to FCFs for fabric login and address assignment. Devices may be logged into only one FCF per fabric. In the event of an FCF failure, all devices that were logged into that FCF must re-login to the fabric through another FCF.

In order to emulate the dual fabric architecture typically found in contemporary SANs, multiple FCFs may be deployed throughout the FCoE environment with different FCFs dedicated to each fabric. FCoE devices may log into a Fabric A FCF and a Fabric B FCF to provide redundant paths through the FCoE environment. Switches housing an FCF (e.g., core switches 108) may have a unique domain ID, similar to native FC switches used in SANs. This limits the number of FCFs that can be deployed in an FCoE environment due to the maximum number of domain IDs allowed in a fabric. The FCF limitation increases the failure domain in an FCoE environment over the failure domain found in native FC environments.

Once a device (e.g., the host 102) logs into a particular FCF, all traffic going to or from that device must traverse that same FCF. Position of the FCF may almost certainly be considered in order to avoid sub-optimal forwarding and oversubscription problems throughout the fabric. To eliminate these issues, FCFs may most likely be positioned centrally between FCoE initiators and targets in the core of the FCoE network.

Centering FCFs in the FCoE core layer creates a single point of fabric failure within an environment containing only two core switches. Because this is unacceptable for customers deploying FCoE networks, core switches 108 may most likely be doubled in order to provide redundant FCFs for a single fabric. In the topology 100 of FIG. 1, for example, each fabric has two core switches 108 such that there is no single point of fabric failure at the core layer. Changing the architecture of the SAN by adding additional switches has become challenging since this results in a modification of Ethernet architecture. Not only this, but such FCF redundancy achieved by doubling the core switches increases the cost and complexity of a dual-fabric SAN.

An Example Virtual FCF (vFCF)

Figure 2:
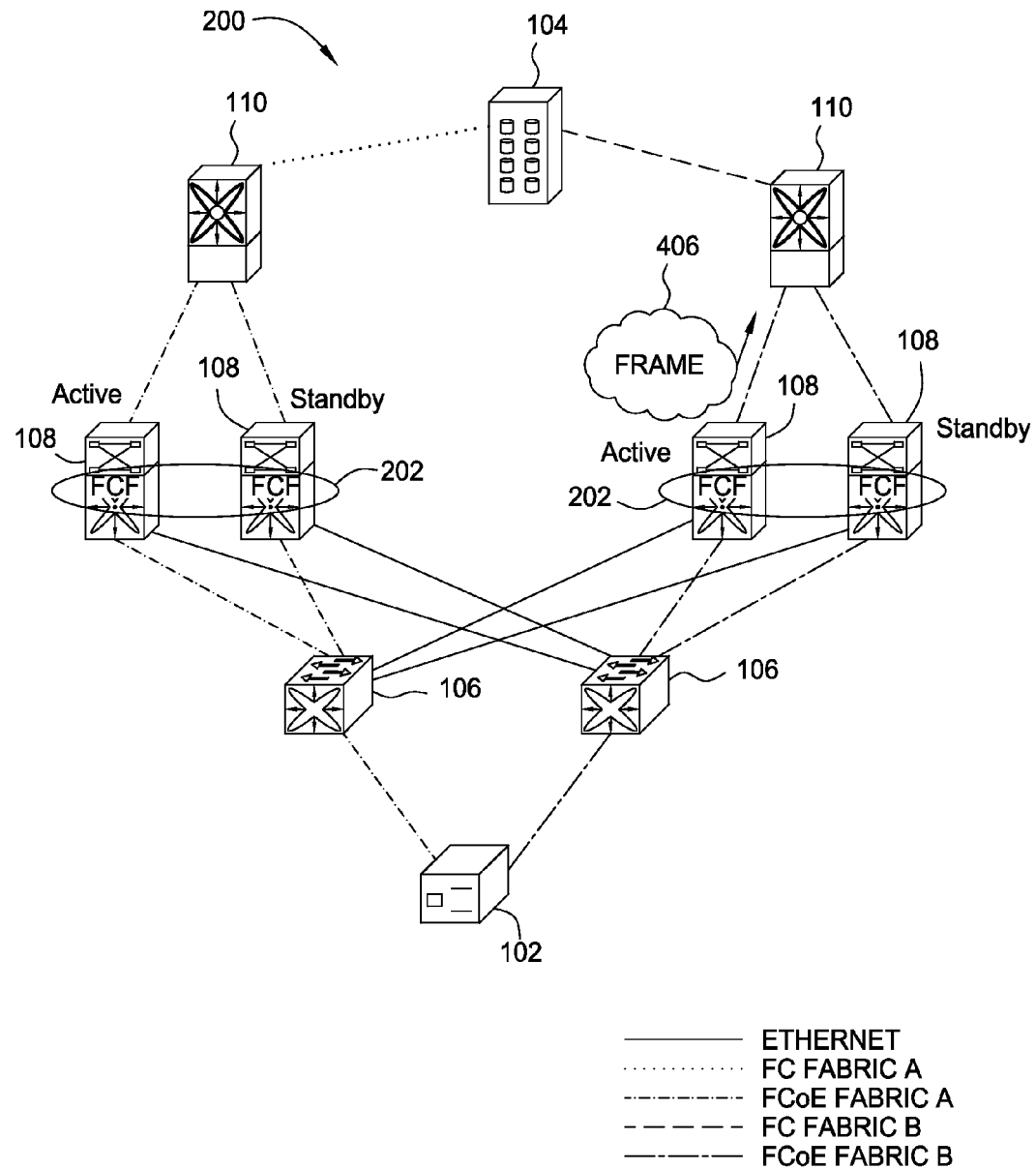
FIG. 2 illustrates an example FCoE topology utilizing a virtual FCF (vFCF) distributed between two FCoE core switches in each of two fabrics, in accordance with one embodiment of the present disclosure.

In order to solve these problems, embodiments of the present disclosure provide a virtual FCF (vFCF) distributed in the core layer of an FCoE environment between two or more FCoE-enabled core switches. FIG. 2 illustrates an example FCoE topology 200 utilizing a vFCF 202 distributed between two FCoE core switches 108 in each of Fabrics A and B.

The vFCF may be referred to by a single virtual domain ID. Host and initiator login and state information held in the vFCF may be synchronized between the FCoE-enabled core switches, thereby eliminating the issue of having a single point of failure for one fabric without the need to double the number of core switches in the FCoE environment. Initiators and targets need not login to an FCF on a per switch basis. Rather, initiators and targets may login on a per fabric basis. Furthermore, because all of the FCoE-enabled core switches may most likely contain identical login and state information for each fabric's vFCF, the loss of a core switch may no longer mean a loss of a fabric because hosts and initiators may stay logged in through the other core switch(es) in the fabric.

Within the core switches 108, the FCFs for an individual fabric distributed across two or more switches (i.e., the FCFs included in a vFCF) may default to one FCF entering an active state and the remaining FCFs being in a standby state as illustrated in FIG. 2. The decision on which FCF enters the active state may be based on the FCF with the lowest MAC address, for example. The active/standby states of the FCFs may be altered by setting FCF priorities per virtual local area network (VLAN). For some embodiments, two or more FCFs within a vFCF may enter the active state in an effort to balance the load among more than one FCF. This may also be achieved by setting FCF priorities on a VLAN basis. When setting these other distributed FCF redundancy protocol parameters, preempt behavior may be set to "On" by default but may be switched to "Off" by configuration.

An Example Fabric Login Sequence with vFCF

Figure 3:
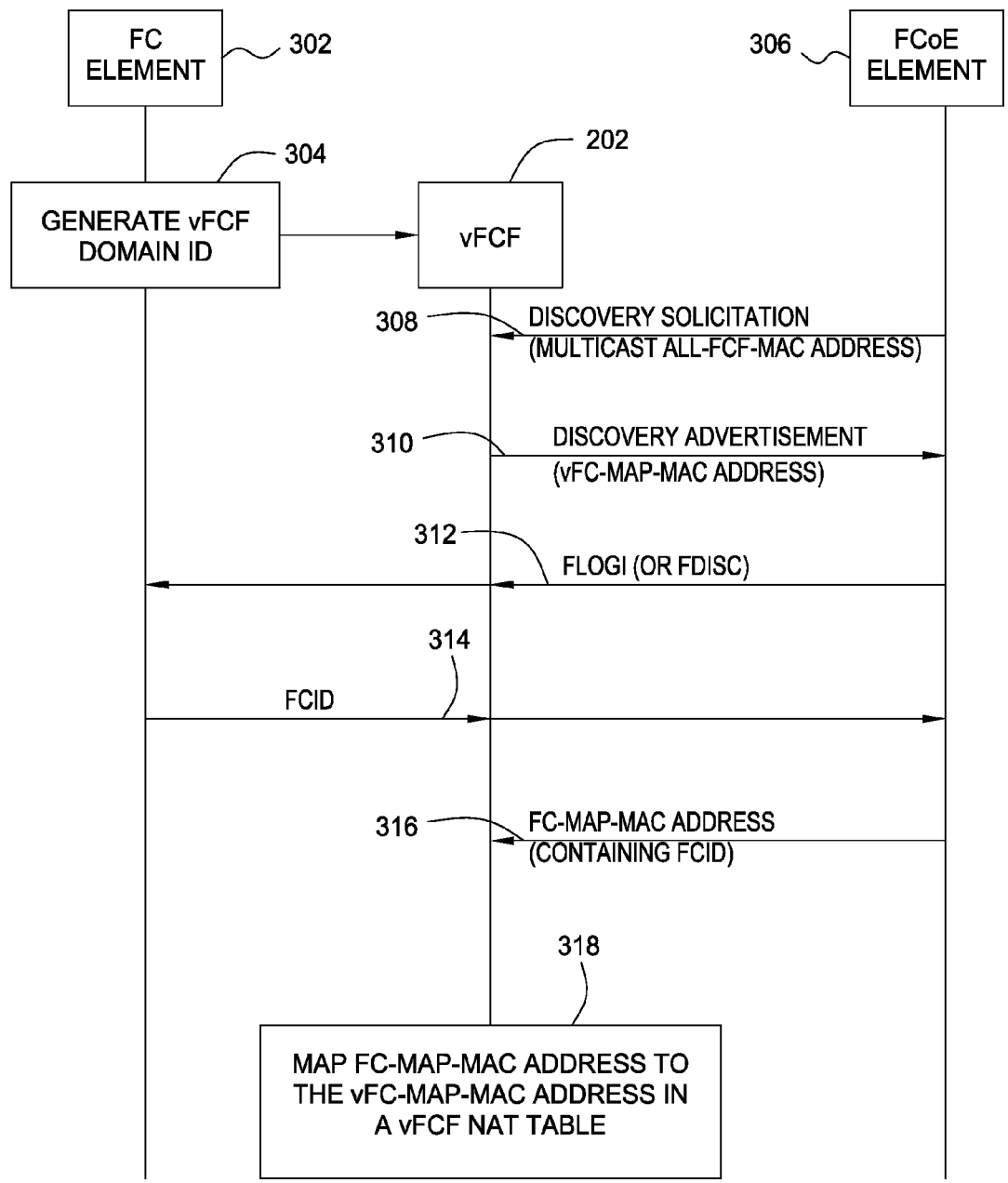
FIG. 3 illustrates creation of a vFCF, a fabric login sequence of an FCoE core switch with the existence of the vFCF, and maintenance of a vFCF Network Address Translation (NAT) table, in accordance with one embodiment of the present disclosure.

FIG. 3 illustrates creation of a vFCF, a fabric login sequence of an FCoE core switch with the existence of the vFCF, and maintenance of a vFCF Network Address Translation (NAT) table. In FIG. 3, a native FC switch element 301, such as an edge layer switch 110, may generate a unique vFCF domain ID with a MAC address at 304. The MAC address generated for the vFCF (vFC-MAP-MAC) may follow the same functionality as Hot Standby Routing Protocol (HSRP) or Global Load Balancing Protocol (GLBP).

An FCoE switch element 306, such as a core switch 108, may begin its fabric login sequence utilizing FCoE Initialization Protocol (FIP) by sending a Discovery Solicitation at 308 to a multicast All-FCF-MAC address. The vFCF 202 may receive the Discovery Solicitation and may respond at 310 with a unicast Discovery Advertisement containing the MAC address of the vFCF (vFC-MAP-MAC). At 312, the FCoE switch element 306 may send a fabric login request (FLOGI) or a fabric discovery request (FDISC) to the MAC address provide by the vFCF for fabric login.

The vFCF 202 may act as a proxy for fabric login for each real FCF residing on the FCoE core switches 108. As such, the vFCF 202 may forward the FLOGI or FDISC request on to the fabric, and the fabric may issue a Fibre Channel ID (FCID) in response to this request. At 314, the fabric may transmit the issued FCID to the FCoE switch element 306 via the vFCF 202 as the fabric login proxy. The FCF residing on the FCoE switch element 306 may respond at 316 with a real FC-MAP-MAC address containing the issued FCID.

Figure 4A:
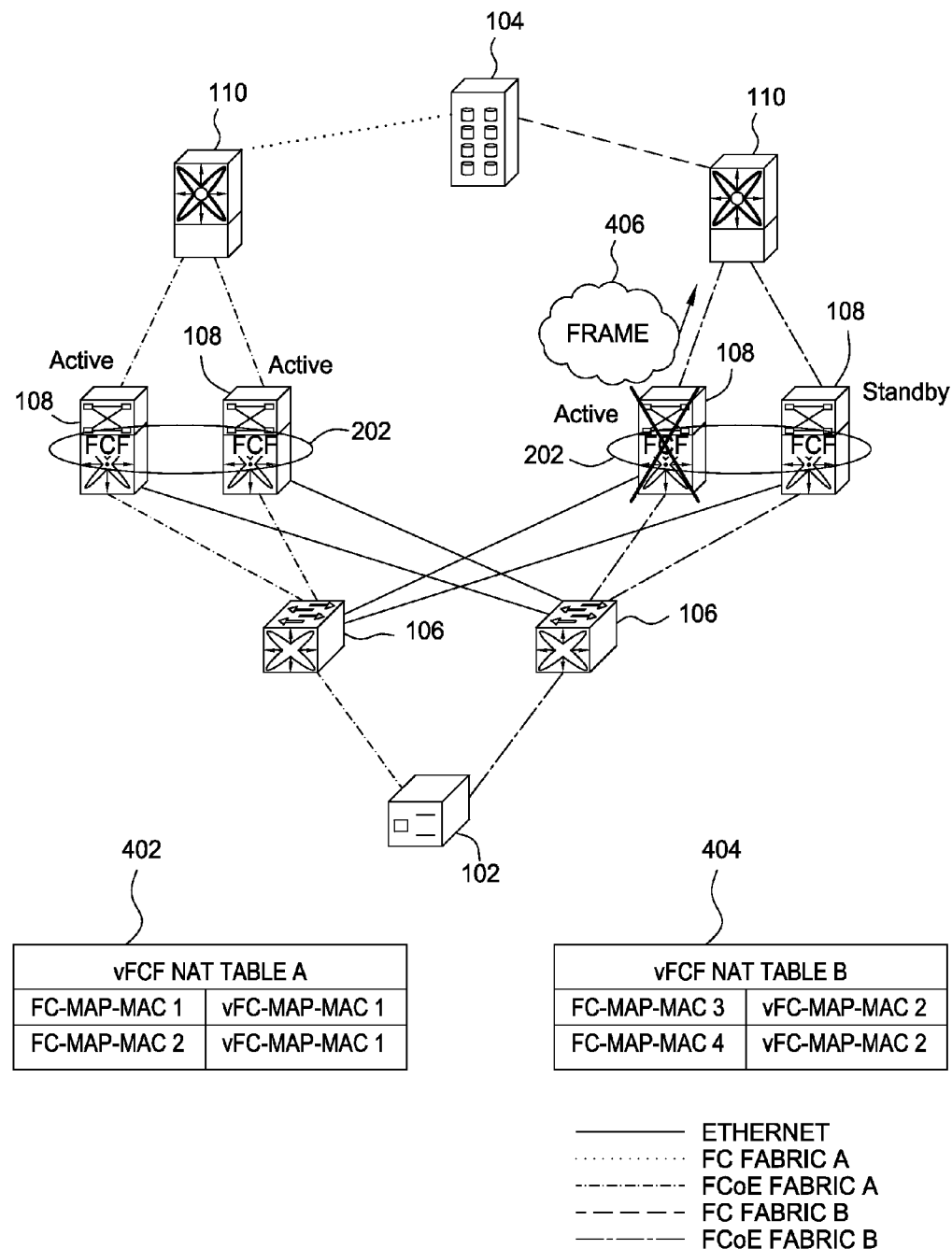
FIGS. 4A and 4B illustrate frame forwarding in the event of an FCoE core switch failure in the topology of FIG. 2, in accordance with embodiments of the present disclosure.

At 318, the vFCF 202 may map the FC-MAP-MAC address to the vFC-MAP-MAC address in a vFCF NAT table. For example, FIG. 4A illustrates a vFCF NAT table for Fabric A 402 mapping the FC-MAP-MAC addresses for the two FCFs depicted (FC-MAP-MAC1 and FC-MAP-MAC2) to the MAC address of the vFCF for Fabric A (vFC-MAP-MAC1). Similarly, FIG. 4A also illustrates a vFCF NAT table for Fabric B 404 mapping the FC-MAP-MAC addresses for the two FCFs depicted (FC-MAP-MAC3 and FC-MAP-MAC4) to the MAC address of the vFCF for Fabric B (vFC-MAP-MAC2). The fabric login sequence described above may be repeated for all FCoE switch elements in the fabric.

Frame Forwarding and FCoE Core Switch Failure with vFCF

As described above, only one of the FCFs in a vFCF may be active, while the other FCFs in the vFCF may be on standby. In FIG. 4A, frames 406 are being forwarded in Fabric B using the active FCF of the vFCF 202 while communications with the active FCF are operable. In forwarding the frames 406 across the fabric, FCoE devices may use their vFC-MAP-MAC addresses. The vFCF-MAP-MAC address may comprise 48 bits, where the first 24 bits may include the fabric identifier and the second 24 bits may include the FCID of the device logging into the fabric. The fabric identifier may contain the virtual domain ID of the vFCF.

Figure 4B:
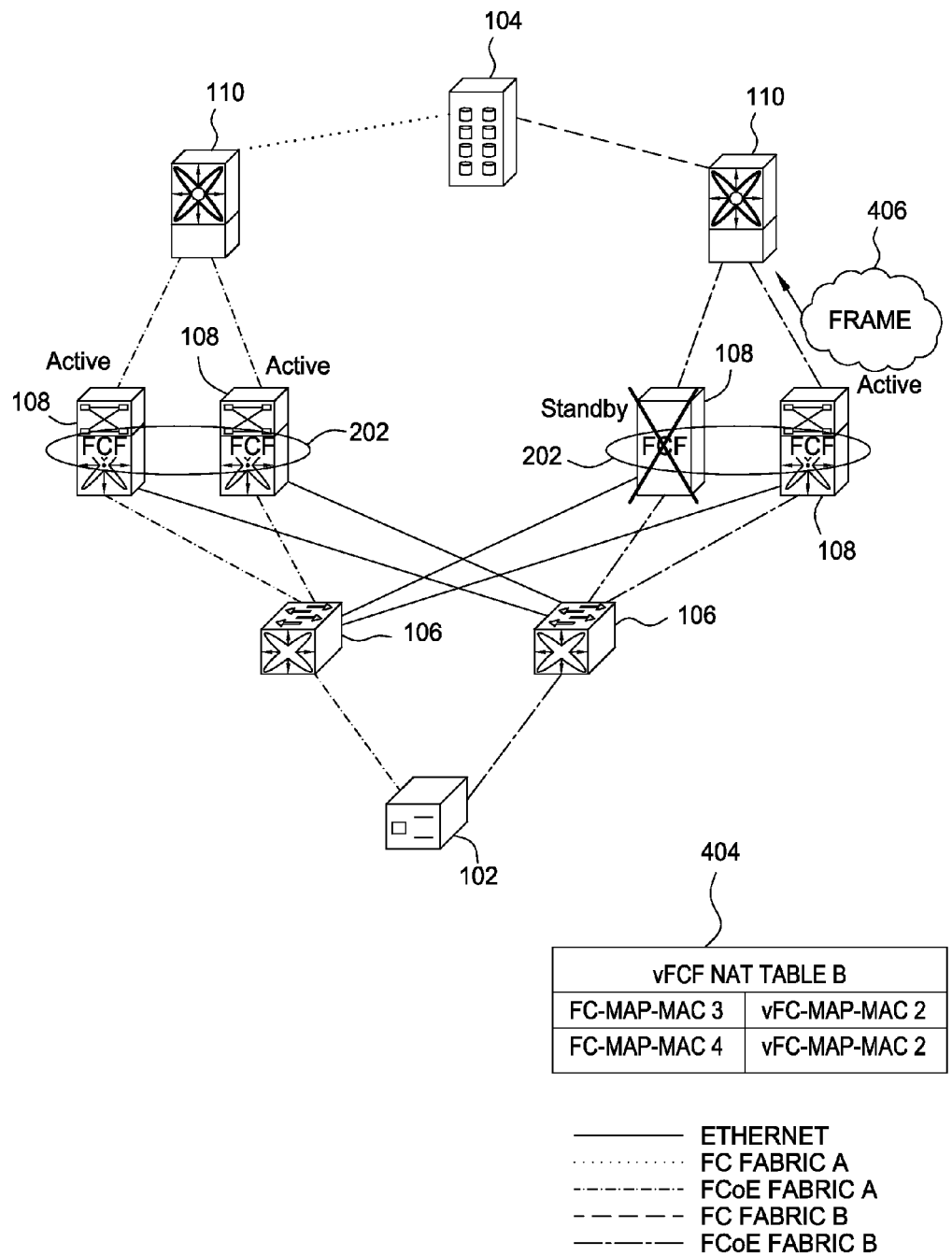

In the event of a communication failure where, for example, the active FCF goes down or a communication link with the active FCF becomes inoperable, the standby FCF may still be able to answer for the vFC-MAP-MAC address according to the vFCF NAT table 404. In this manner, frames 406 may be forwarded in Fabric B using the FCF that was formerly on standby, as illustrated in FIG. 4B. The distributed FCF redundancy protocol described above not only allows fabric login and state information to be distributed between FCoE-enabled switches, but may handle updates to all FCoE-enabled switches in each fabric, as well.

As for devices other than the core switches 108 in the fabric, the host 102 may send a login acknowledgment to the vFCF 202, which uses the vFCF NAT table to forward frames 406 to the real FCFs. The native FC devices may follow the normal FC login process in a switched fabric. All fabric logins may be distributed to real FCF name servers following FC standards. Native FC devices may utilize the vFCF NAT tables to communicate with FCoE attached devices.

Implementing a vFCF distributed between two or more FCoE-enabled core switches offers several advantages. First, an FCoE fabric with a vFCF has no single point of failure. Moreover, the distribution of fabric logins between FCoE-enabled switches provides more efficient load balancing of fabric logins between FCFs and ensures that a device need not re-login to the fabric in the event of a single device failure. Not only does a vFCF provide FCF redundancy, but the topology described herein offers a fully redundant dual-fabric solution without doubling the number of FCoE-enabled switches. This topology also follows native FC architectures employed today in SAN fabrics. Furthermore, Ethernet architectures need not be altered to provide path redundancy for FCoE traffic.

While the foregoing is directed to embodiments of the present disclosure, other and further embodiments of the disclosure may be devised without departing from the basic scope thereof, and the scope thereof is determined by the claims that follow.

The invention claimed is:

1. A method of Fibre Channel over Ethernet (FCoE) communication, comprising:
   providing two or more FCoE forwarders (FCFs) for each of two or more fabrics including a first virtual fabric;
   assigning, for each of the two or more FCFs of each respective fabric, media access control (MAC) addresses using a respective single MAC address per fabric, wherein each of the two or more FCFs of each fabric have the respective single MAC address for the fabric, wherein the respective single MAC address assigned for each fabric comprises a virtual FC-MAP-MAC (vFC-MAP-MAC) address for a virtual FCoE forwarder (vFCF) of each respective fabric;
   receiving an FCoE frame addressed with the single MAC address for the first virtual fabric;
   in the absence of a communication failure with any of the two or more FCFs for the first virtual fabric, forwarding the FCoE frame to a first FCF of the two or more FCFs for the first virtual fabric; and
   after the occurrence of a communication failure with any of the two or more FCFs for the first virtual fabric, forwarding the FCoE frame to a second FCF of the two or more FCFs for the first virtual fabric.

2. The method of claim 1, wherein each of the two or more fabrics have a respective domain ID, wherein assigning the MAC addresses of the two or more FCFs for each respective fabric with a single MAC address per fabric comprises creating a Network Address Translation (NAT) table for each respective fabric mapping the MAC addresses of the two or more FCFs for the fabric to the single MAC address.

3. The method of claim 2, wherein the single MAC address comprises a fabric identifier and a Fibre Channel ID (FCID) of a device that transmitted the FCoE frame, the fabric identifier including a domain ID associated with the single MAC address.

4. The method of claim 3, wherein the first FCF is different from the second FCF, the method further comprising:
   synchronizing host login, initiator login, and state information between each of the two or more FCFs, wherein the state information comprises an active state and a standby state.

5. The method of claim 4, wherein in the absence of a communication failure, the first FCF is in an active state, the second FCF is in the standby state, and forwarding the FCoE frame in the absence of a communication failure comprises forwarding the FCoE frame to the first FCF in the active state.

6. The method of claim 5, wherein the first FCF in the active state has the lowest MAC address out of the two or more FCFs, wherein the two or more FCFs for the first virtual fabric and two or more FCFs for a second fabric are provided in a single FCoE core switch.

7. The method of claim 5, wherein the communication failure comprises a failure to communicate with the first FCF and forwarding the FCoE frame comprises forwarding the FCoE frame to the second FCF, which enters the active state, wherein a host and an initiator logged in to a fabric through the first FCF stay logged in to the fabric through the second FCF without having to log into the second FCF based on the synchronized host login, initiator login, and state information, and wherein the first FCF and the second FCF are in the active state prior to the failure.

8. A computer program product comprising logic encoded in one or more non-transitory tangible media for execution and when executed by a processor operable to:
provide two or more FCoE forwarders (FCFs) for each of two or more fabrics including a first virtual fabric;
assign, for each of the two or more FCFs of each respective fabric, media access control (MAC) addresses using a respective single MAC address per fabric, wherein each of the two or more FCFs of each fabric have the respective single MAC address for the fabric, wherein the respective single MAC address assigned for each fabric comprises a virtual FC-MAP-MAC (vFC-MAP-MAC) address for a virtual FCoE forwarder (vFCF) of each respective fabric;
receive an FCoE frame addressed with the single MAC address;
in the absence of a communication failure with any of the two or more FCFs for the first virtual fabric, forward the FCoE frame to a first FCF of the two or more FCFs for the first virtual fabric; and
after the occurrence of a communication failure with any of the two or more FCFs for the first virtual fabric, forward the FCoE frame to a second FCF of the two or more FCFs for the first virtual fabric.

9. The computer program product of claim 8, wherein each of the two or more fabrics have a respective domain ID, wherein assigning the MAC addresses of the two or more FCFs for each respective fabric with a single MAC address per fabric comprises creating a Network Address Translation (NAT) table for each respective fabric mapping the MAC addresses of the two or more FCFs for the fabric to the single MAC address.

10. The computer program product of claim 9, wherein the single MAC address comprises a fabric identifier and a Fibre Channel ID (FCID) of a device that transmitted the FCoE frame, the fabric identifier including a domain ID associated with the single MAC address.

11. The computer program product of claim 10, wherein the first FCF is different from the second FCF, the logic further comprising:
synchronizing host login, initiator login, and state information between each of the two or more FCFs, wherein the state information comprises an active state and a standby state.

12. The computer program product of claim 11, wherein in the absence of a communication failure, the first FCF is in the active state, the second FCF is in the standby state, and the logic is operable to forward the FCoE frame in the absence of a communication failure to the first FCF in the active state.

13. The computer program product of claim 12, wherein the first FCF in the active state has a lower MAC address than the second FCF, wherein the two or more FCFs for the first virtual fabric and two or more FCFs for a second fabric are provided in a single FCoE core switch.

14. The computer program product of claim 13, wherein the communication failure comprises a failure to communicate with the first FCF and the logic is operable to forward the FCoE frame to the second FCF, which enters the active state, wherein a host and an initiator logged in to a fabric through the first FCF stay logged in to the fabric through the second FCF without having to log into the second FCF based on the synchronized host login, initiator login, and state information, and wherein the first FCF and the second FCF are in the active state prior to the failure.

15. An apparatus for Fibre Channel over Ethernet (FCoE) communication, comprising:
a Network Address Translation (NAT) table mapping media access control (MAC) addresses of two or more FCoE forwarders (FCFs), for each of two or more fabrics including a first virtual fabric, to a single MAC address per fabric, wherein each of the two or more FCFs of each fabric have the respective single MAC address for the fabric, wherein the respective single MAC address assigned for each fabric comprises a virtual FC-MAP-MAC (vFC-MAP-MAC) address for a virtual FCoE forwarder (vFCF) of each respective fabric; and
logic configured to:
receive an FCoE frame addressed with the single MAC address;
forward the FCoE frame to a first FCF of the two or more FCFs in the absence of a communication failure with any of the two or more FCFs; and
forward the FCoE frame to a second FCF of the two or more FCFs after the occurrence of a communication failure with any of the two or more FCFs, wherein forwarding the FCoE frames in the absence of or after the occurrence of a communication failure is based on the NAT table.

16. The apparatus of claim 15, wherein the apparatus is an FCoE core switch.

17. The apparatus of claim 16, wherein each of the two or more fabrics have a respective domain ID, wherein a host and an initiator logged in to a fabric through the first FCF stay logged in to the fabric through the second FCF without having to log into the second FCF based on the synchronized host login, initiator login, and state information, and wherein the first FCF and the second FCF are in an active state prior to the failure.

18. The apparatus of claim 17, wherein the first FCF is different from the second FCF, the logic further comprising:
synchronizing host login, initiator login, and state information between each of the two or more FCFs, wherein the state information comprises the active state and the standby state.

19. The apparatus of claim 18, wherein the first FCF in the active state has a lower MAC address than the second FCF, wherein the two or more FCFs for the first virtual fabric and two or more FCFs for a second fabric are provided in a single FCoE core switch.

* * * * *